(12) United States Patent
Park et al.

(10) Patent No.: US 7,926,514 B2
(45) Date of Patent: Apr. 19, 2011

(54) VALVE UNIT AND REACTION APPARATUS HAVING THE SAME

(75) Inventors: Jong-myeon Park, Yongin-si (KR);
Yoon-kyuong Cho, Yongin-si (KR);
Jeong-gun Lee, Yongin-si (KR);
Beom-seok Lee, Yongin-si (KR);
Sung-woo Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 11/766,806

(22) Filed: Jun. 22, 2007

(65) Prior Publication Data
US 2008/0029158 A1 Feb. 7, 2008

(30) Foreign Application Priority Data

Aug. 4, 2006 (KR) .................. 10-2006-0073814
Sep. 25, 2006 (KR) .................. 10-2006-0092925

(51) Int. Cl.
*F15C 1/04* (2006.01)
(52) U.S. Cl. .................................. 137/828; 251/11
(58) Field of Classification Search ........... 137/251.1, 137/825, 827, 828, 831; 422/99, 100, 103; 251/11, 129.01
See application file for complete search history.

(56) References Cited

U.S. PATENT DOCUMENTS

| 5,039,559 | A | | 8/1991 | Sang et al. | |
|---|---|---|---|---|---|
| 5,961,492 | A | * | 10/1999 | Kriesel et al. | 604/132 |
| 6,321,721 | B1 | * | 11/2001 | Okumura et al. | 123/491 |
| 6,337,215 | B1 | | 1/2002 | Wilson | |
| 6,679,279 | B1 | | 1/2004 | Liu et al. | |
| 7,195,036 | B2 | * | 3/2007 | Burns et al. | 137/828 |
| 2002/0047003 | A1 | | 4/2002 | Bedingham et al. | |
| 2003/0156991 | A1 | | 8/2003 | Halas et al. | |
| 2006/0219308 | A1 | | 10/2006 | Oh et al. | |
| 2007/0092409 | A1 | * | 4/2007 | Beatty et al. | 422/100 |
| 2008/0187474 | A1 | * | 8/2008 | Park et al. | 422/292 |

FOREIGN PATENT DOCUMENTS

| WO | WO 03/081052 A1 | 10/2003 |
|---|---|---|
| WO | WO 2004/074694 A1 | 9/2004 |
| WO | WO 2004/088148 A1 | 10/2004 |
| WO | WO 2005/107947 | * 11/2005 |
| WO | WO 2007/050418 A | 5/2007 |

OTHER PUBLICATIONS

Robin Hui Liu, et al., "Self-Contained, Fully Integrated Biochip for Sample Preparation, Polymerase Chain Reaction Amplification, and DNA Microarray Detection", Analytical Chemistry, vol. 76, No. 7, Apr. 1, 2004 pp. 1824-1831.
Park, Jong-Myeon, et al., "Multifunctional microvalves control by optical illumination on nanoheaters and its application in centrifugal microfluidic devices," Lab On a Chip, Royal Soc. Of Chemistry, Cambridge,GB, vol. 7, Feb. 15, 2007, p. 557-564.

* cited by examiner

*Primary Examiner* — Craig M Schneider
(74) *Attorney, Agent, or Firm* — Sughrue Mion, PLLC (57) ABSTRACT

Provided are a valve unit and a reaction apparatus having the valve unit. The valve unit includes a phase transition material, which melts and expands upon an application of the electromagnetic waves to the valve filler, and the valve filler is directed into the channel through the connection passage and closes the channel. The valve unit also includes heat generation particles, which are dispersed in the phase transition material and generate heat upon an application of electromagnetic wave energy.

44 Claims, 10 Drawing Sheets

VALVE UNIT AND REACTION APPARATUS HAVING THE SAME

CROSS-REFERENCE TO RELATED PATENT APPLICATION

This application claims the benefit of Korean Patent Application Nos. 10-2006-0073814 and 10-2006-0092925, filed on Aug. 4, 2006 and Sep. 25, 2006, in the Korean Intellectual Property Office, the disclosure of which is incorporated herein in its entirety by reference.

BACKGROUND OF THE INVENTION

1. Field of the Invention

The present invention relates to a closing valve unit that can close a channel in a timely manner so as to block fluid flow and a reaction apparatus having the closing valve.

2. Description of the Related Art

Generally, a substrate (i.e., a chip) used for a biochemical reaction such as a lysis reaction or a polymerase chain reaction (PCR) is provided with a micro-channel constituting a flow path. In order to prevent the fluid from being vaporized or flowing during the biochemical reaction, the micro-channel should be closed on time. A micro-valve unit has been proposed to control the flow of fluid in the micro-channel.

Figure 1:
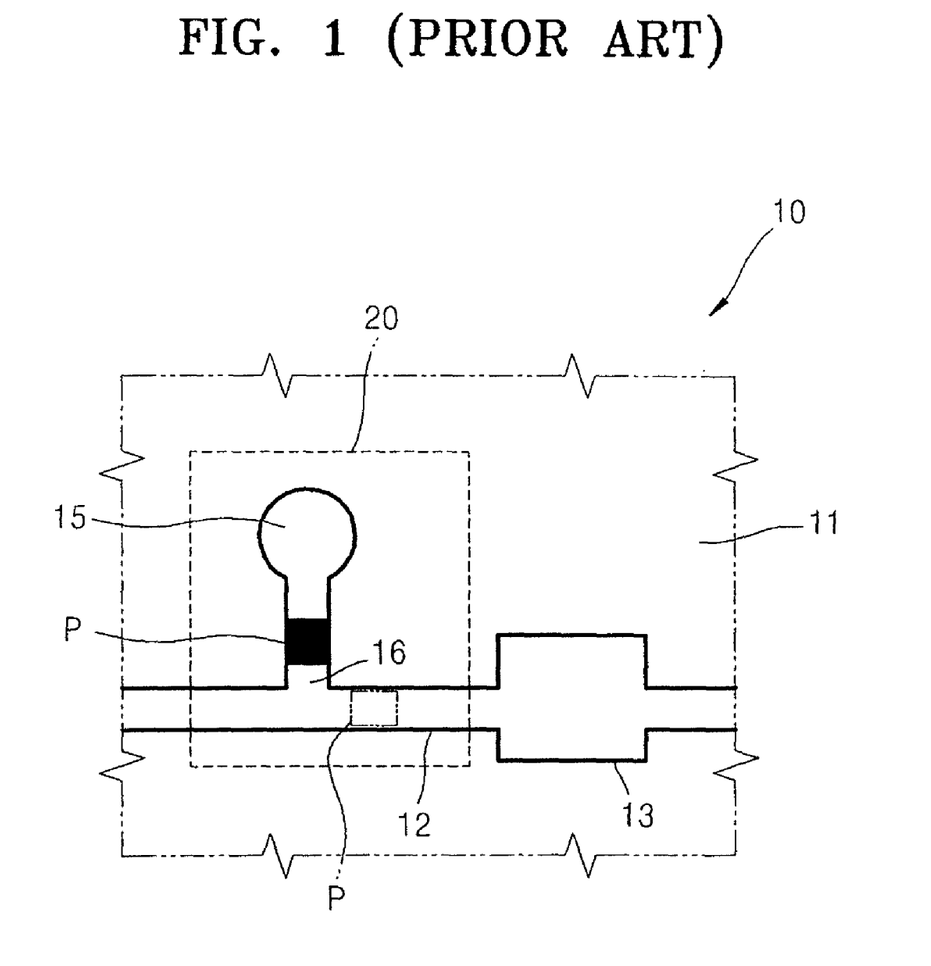
FIG. 1 is a top view of a conventional valve.

One of such micro-valve is shown in FIG. 1. FIG. 1 is a top view of a conventional valve disclosed in U.S. Pat. No. 6,679,279 and Anal. Chem. Vol. 76, pages 1824-1831, 2004.

Referring to FIG. 1, a conventional valve unit 10 includes a channel 12 formed on a substrate 11, an air pump 15 connected to the channel 12, and paraffin wax P provided on a connecting passage 16 between the air pump 15 and the channel 12. In order to heat the air pump 15 and the paraffin wax P, a heating plate 20 is mounted on the substrate 11. The paraffin wax P undergoes solid-liquid-phase transition in response to changes in temperature. In initial stage, the paraffin wax P is in solid and clogs the connecting portion 16. Upon an application of heat generated by the heating plate 20, the paraffin wax P is melted, and the air pump 15 is activated, the melted paraffin wax P' is pumped toward the channel 12 by the air expansion in the air pump 15, as shown by the double dashed line of FIG. 1. The reference number 13 denotes a main reaction chamber 13 where a biochemical reaction occurs.

However, in the conventional valve unit 10, the air pump 15 and the heating plate 20 are provided on the substrate 11, making it difficult to miniaturize and fabricate the substrate 11. In addition, it takes a relatively long time to close the channel by re-solidifying the paraffin wax that is melted by the heat and directed to the channel. Therefore, it is difficult to precisely control the closing timing of the channel 12.

SUMMARY OF THE INVENTION

The present invention provides an improved valve unit that allows the miniaturization of the valve unit in microfluidic system and the integration of a biochemical reaction substrate, and a reaction apparatus having the valve unit.

The present invention also provides a valve unit that can close a channel upon irradiation of electromagnetic waves, such as a laser beam, and a reaction apparatus having the valve unit.

According to an aspect of the present invention, there is provided a valve unit including: a valve filler which includes a phase transition material and a plurality of heat generation particles; a chamber to receive the valve filler; a fluid channel; and a connection passage which is located between the chamber and the fluid channel and provides fluid communication between the chamber and the fluid channel, wherein the heat generation particles are dispersed in the phase transition material and generate heat upon an application of electromagnetic wave energy, and wherein the phase transition material melts and expands upon an application of heat which is generated by the heat generation materials, thereby the valve filler is directed into the channel through the connection passage and closes the channel. The valve unit may further include an external energy source which applies electromagnetic waves to the valve filler.

According to another aspect of the present invention, there is provided a reaction apparatus including: a substrate which provides a reaction chamber and a fluid channel, each fluid communicate with the other; and a valve unit which closes the fluid channel, wherein the valve unit includes: a valve filler which includes a phase transition material and a plurality of heat generation particles; a valve chamber to receive the valve filler; and a connection passage, wherein the connection passage is located between the valve chamber and the fluid channel and provides fluid communication between the valve chamber and the fluid channel, wherein the heat generation particles are dispersed in the phase transition material and generate heat upon an application of electromagnetic wave energy; wherein the phase transition material is in solid phase at an operational temperature of the apparatus, and wherein the phase transition material melts and expands upon an application of heat which is generated by the heat generation materials, thereby the valve filler is directed into the channel through the connection passage and closes the channel.

The valve unit may further include an external energy source which applies electromagnetic waves to the valve filler. The external energy source may comprise a laser beam source irradiating a laser beam.

The laser beam source may include a laser diode.

The laser beam emitted from the laser beam source may be a pulse electromagnetic wave having an energy of at least 1 mJ/pulse.

The laser beam emitted from the laser beam source may be a continuous wave electromagnetic wave having an output of at least 10 mW.

The laser beam emitted from the laser beam source may have a wavelength in the range of 750 to 1300 nm.

The heat generation particles may have an average diameter in the range of 1 nm to 100 μm. The heat generation particles may be dispersed in hydrophobic carrier oil.

The heat generation particles may include a ferromagnetic material or a metal oxide. The metal oxide may be at least one selected from the group consisting of $Al_2O_3$, $TiO_2$, $Ta_2O_3$, $Fe_2O_3$, $Fe_2O_4$, and $HfO_2$.

The heat generation particles may have be in the form of a quantum dot or a magnetic bead. The heat generation particles may be formed of a polymer.

The magnetic bead may include at least one magnetic material selected from the group consisting of Fe, Ni, Cr, and an oxide thereof.

The phase-transition material may be at least one selected from the group consisting of wax, a gel, and a thermoplastic resin.

The wax may be at least one selected from the group consisting of paraffin wax, microcrystalline wax, synthetic wax, and natural wax.

The gel may be formed of at least one material selected from the group consisting of polyacrylamide, polyacrylates, polymethacrylates, and polyvinylamides.

The thermoplastic resin may be at least one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The valve unit may further include a buffer chamber in the connection passage.

The reaction apparatus, which includes the valve unit of the present invention, may further include a rotating unit for rotating the substrate, wherein the valve filler to which the electromagnetic wave is irradiated is pumped to the fluid channel by a centrifugal force generated by the rotation of the substrate.

The reaction apparatus may include multiple valve units, each located at inlet port and outlet port sides of the reaction chamber.

The substrate may include upper and lower plates bonded together.

The upper and lower plates may be bonded together by adhesive or are thermally bonded together by an ultrasonic wave. Alternatively, the upper and lower plates may be bonded together by a double-side adhesive layer.

The fluid channel, the reaction chamber, the valve chamber, and the connection passage may be formed on one of the upper and lower plates of the substrate.

The substrate may be provided with a fluid hole, through which a fluid is injected into the fluid channel, and with a valve filler hole, through which the valve filler is injected into the valve chamber.

At least a portion of the substrate may be transparent so that the electromagnetic wave can be transmitted therethrough.

The present invention also provides a valve unit including: a valve filler; a valve chamber filled with the valve filler; a fluid channel; and a connection passage connecting the valve chamber to the fluid channel, wherein, the valve filler includes a phase-transition material which melts and expands its volume upon an application of the electromagnetic waves and flows into the channel through the connection passage to close the channel. The valve unit may further include an external energy source irradiating electromagnetic waves to the valve filler.

The present invention also provides a reaction apparatus including: a substrate which provides a fluid channel and a reaction chamber; and a valve unit which closes the fluid channel, wherein the valve unit includes a valve filler; a valve chamber filled with the valve filler; and a connection passage connecting the valve chamber to the fluid channel, wherein, the valve filler includes a phase-transition material which is in solid phase at an operational temperature of the apparatus, melts and expands its volume upon an application of the electromagnetic waves, and flows into the channel through the connection passage to close the channel. The valve unit of the reaction apparatus may further include an external energy source irradiating electromagnetic waves to the valve filler.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

While the present invention has been particularly shown and described with reference to exemplary embodiments thereof, it will be understood by those of ordinary skill in the art that various changes in form and details may be made therein without departing from the spirit and scope of the present invention as defined by the following claims.

Figure 2A:
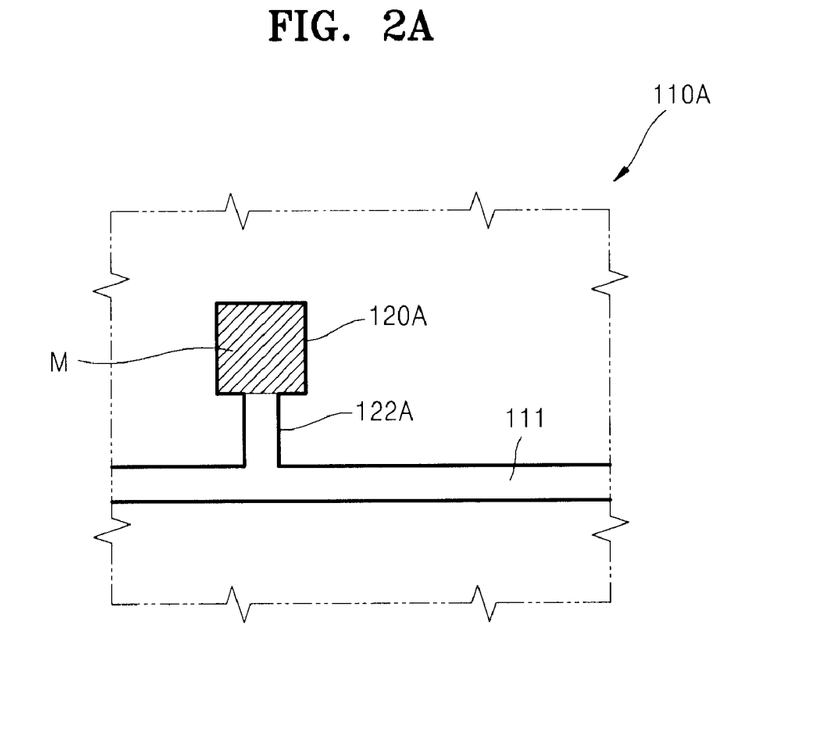
FIG. 2A and FIG. 2B are top views of a valve unit according to one exemplary embodiment of the present invention.
Figure 2B:
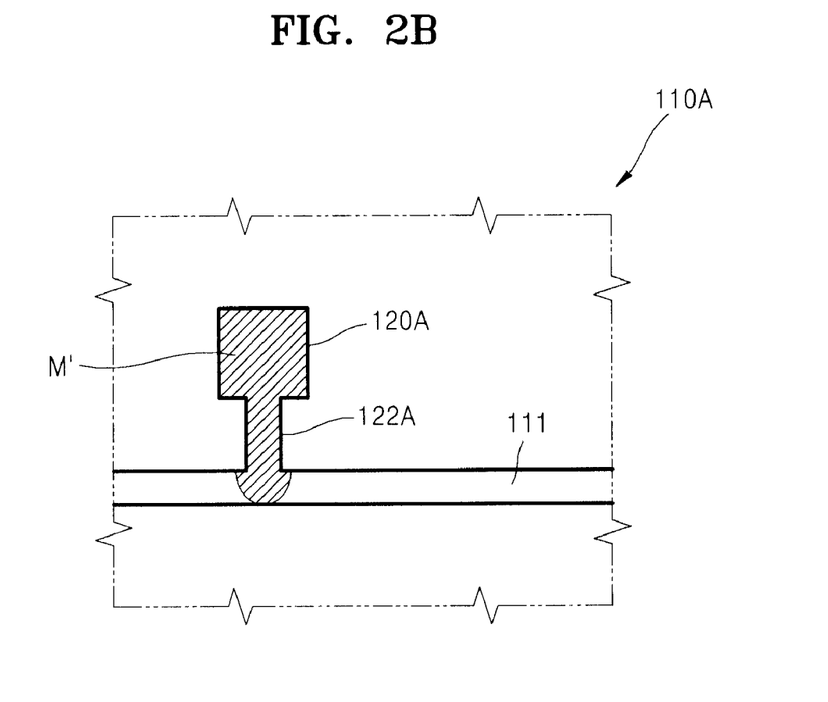

FIGS. 2A and 2B are top views of a valve unit according to one exemplary embodiment of the present invention.

Referring to FIGS. 2A and 2B, the valve unit 110A includes a valve filler M which includes a phase transition material and a plurality of heat generation particles; a chamber 120A to receive the valve filler; a fluid channel 111; and a connection passage 122A which is located between the chamber and the fluid channel and provides fluid communication between the chamber and the fluid channel. The phase transition material undergoes changes in its phase depending on the temperature and is expandable upon an application of heat. The heat generation particles are dispersed in the phase transition material and generate heat upon an application of electromagnetic wave energy. The valve unit includes an external energy source (not shown) which applies electromagnetic waves to the valve filler.

Figure 3:
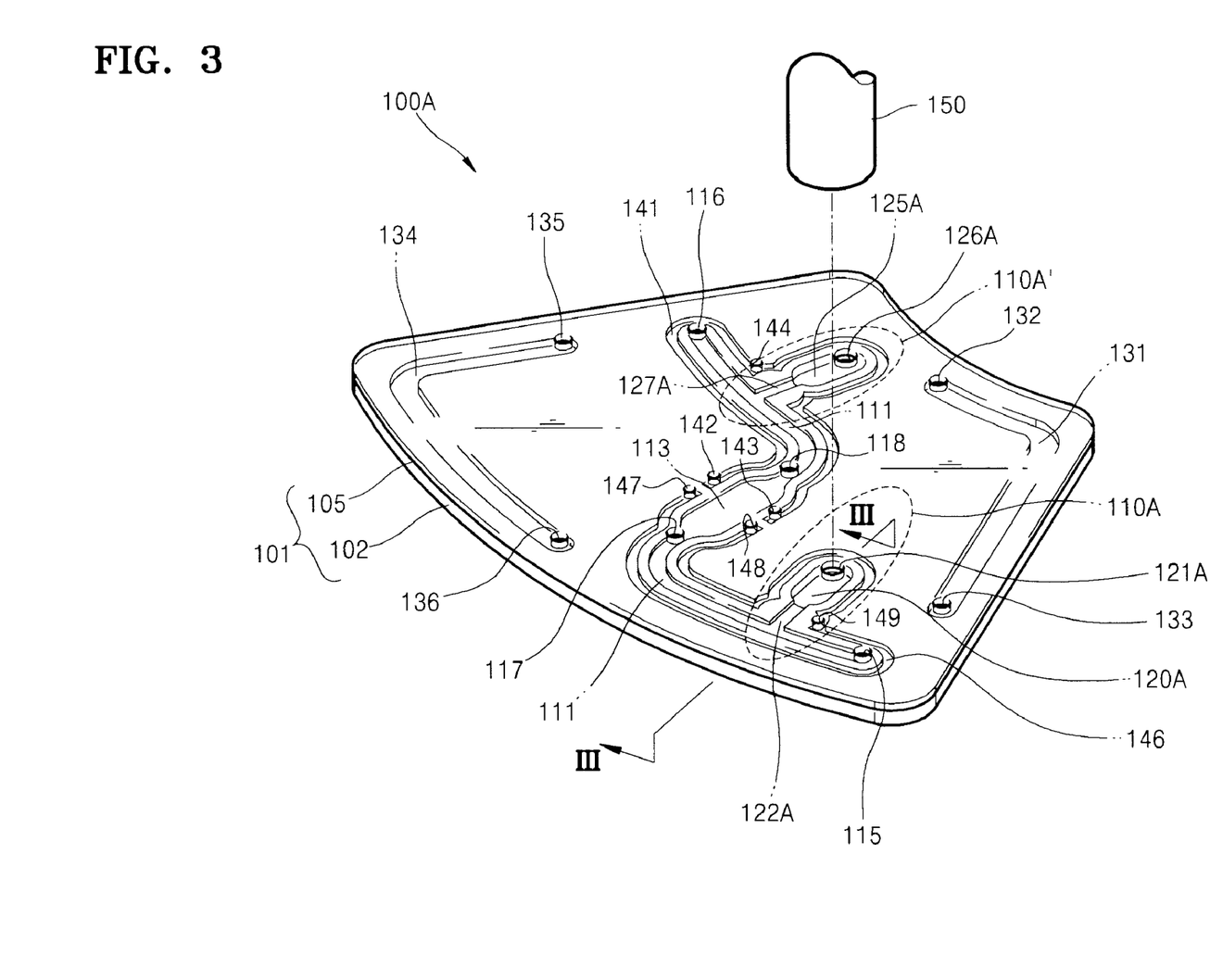
FIG. 3 is a perspective view of a reaction apparatus to which a valve unit according to an embodiment of the present invention is applied.
Figure 4:
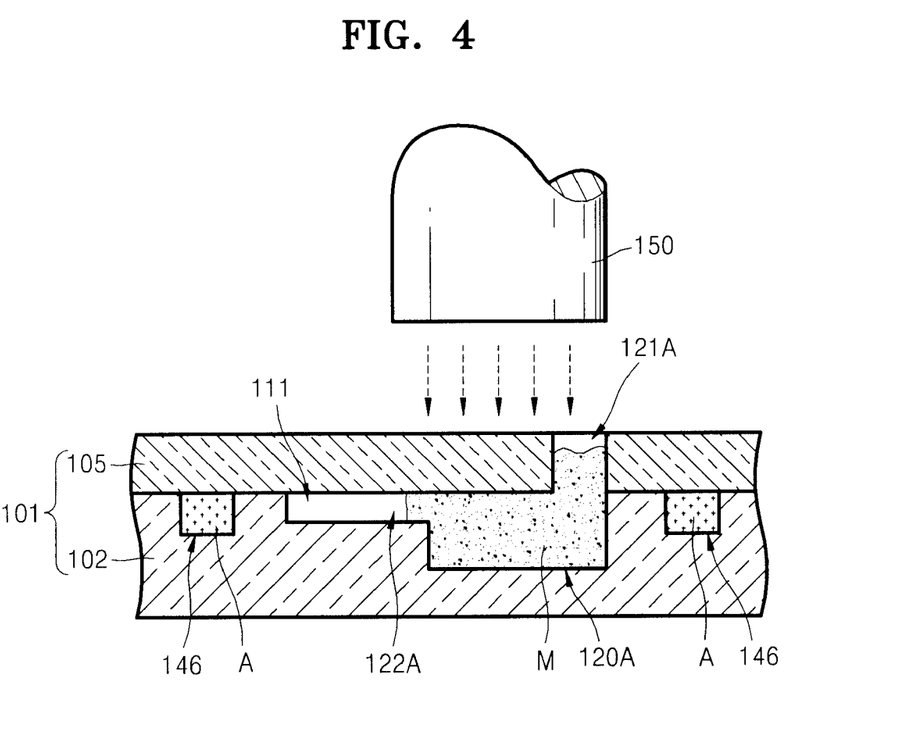
FIG. 4 is a sectional view taken along the line III-III of FIG. 3.

FIG. 3 is a perspective view of a reaction apparatus into which a valve unit according to an embodiment of the present invention is integrated and FIG. 4 is a sectional view taken along the line III-III of FIG. 3.

Referring to FIGS. 3 and 4, a reaction apparatus 100A includes a fluid channel 111 forming a passage for a fluid, for example a biochemical reaction fluid, a substrate 101 which is provided with a reaction chamber 113, and a valve unit 110A for closing the fluid channel 111 on time. The reaction chamber 113 provides a space where the biochemical reaction of the fluid occurs and is observed.

The substrate 101 includes lower and upper plates 102 and 105 bonded together by an adhesive A. The lower plate 102 is provided with the fluid channel 111 and the reaction chamber 113. The upper plate 105 is provided with a plurality of fluid holes 115 and 116 through which the fluid is injected and a plurality of vent holes 117 and 118 for preventing the generation of bubbles in the reaction chamber 113.

Reference number 131 indicates an adhesive channel for forming a passage for the adhesive A. The upper plate 105 is provided with adhesive holes 132 and 133 through which the adhesive A is injected into the adhesive channel 131. When the adhesive A is injected through one of the adhesive holes 132 and 133, the adhesive A is deposited along the adhesive channel 131 while air is exhausted out of the adhesive channel 131 through the other of the adhesive holes 132 and 133. As the adhesive A hardens, the lower and upper plates 102 and 105 bond together. Reference numbers 134, 141 and 146 indicate other adhesive channels formed on the lower plate 102. Reference number 135 and 136 denote adhesive holes for the adhesive channel 134. Reference numbers 142, 143 and 144 denote adhesive holes for the adhesive channel 141. Reference numbers 147, 148 and 149 denote adhesive holes for the adhesive channel 146.

Even though FIGS. 3 and 4 and their description are directed to an exemplary embodiment employing an adhesive A to fabricate the reaction apparatus 100A, the reaction apparatus including the channels and chambers may be produced by fabricating the upper and lower plates and a double sided adhesive layer, which has a pattern (through holes) corresponding to the chamber and channels, discussed herein.

The reaction apparatus shown in FIG. 3 has two valve units 110A and 110A', each situated at opposite ends of the reaction chamber 113. The valve units 110A and 110A' each include valve chambers 120A and 125A, and connection passages 122A and 127A, respectively. It reaction apparatus further includes a laser beam source 150, which is an exemplary external energy source radiating electromagnetic waves toward the valve chambers 120A and 125A. The valve chambers 120A and 125A may be formed in one of the lower and the upper plates. In one exemplary embodiment shown in FIGS. 3 and 4, they are formed on the lower plate 102 of the substrate 101 and filled with a valve filler M. The upper plate 105 is provided with valve filler holes 121A and 126A through which valve filler is injected into the valve chambers 120A and 125A.

The connection passage 122A connects the valve chamber 120A to the fluid channel 111. The connection passage 127A connects the valve chamber 125A to the fluid channel 111. The connection passages 122A and 127A may be formed in one of the lower and the upper plates. In one exemplary embodiment shown in FIGS. 3 and 4, they are formed on the lower plate 102 of the substrate 101. The valve unit 110A closes the fluid channel connected to one side of the reaction chamber 113, and the other valve unit 110A' closes the fluid channel connected to the other side of the reaction chamber 113.

The entire portion or at least a portion, where overlaps the valve chamber 120A of the valve unit 110A and the valve chamber 125A of the valve unit 110A', of the upper plate 105 is transparent so as to allow a laser beam emitted from the laser beam source 150 to be transmitted to the valve chambers 120A and 125A. Therefore, the upper plate 105 may be formed of glass or a transparent plastic material. The lower plate 102 may be formed of a material which is identical to or different from that of the upper plate 105. Meanwhile, when the lower plate 102 is formed of a silicon material, which is highly thermal-conductive, a reaction such as the PCR requiring thermal cycling can be quickly and reliably performed.

The valve filler M may include a phase-transition material that is in a solid state at an operational temperature and a plurality heat generation particles dispersed in the phase-transition material. In one embodiment, the particles are uniformly dispersed in the phase-transition material. The particles may be embedded in the phase-transition material and present on the surface of the phase-transition material when the phase-transition material is in solid phase. The phase-transition material may be wax that is phase-changed into a liquid state, which causes its volume to expand when it is heated. For example, the wax may be paraffin wax, microcrystalline wax, synthetic wax, or natural wax. These waxes have various ranges of a phase-transition temperature. In one embodiment, a paraffin wax of a phase-transition temperature of about 50-52° C. may be used. In one embodiment, the heat may be applied to the valve chamber to a range of temperature of about 20-30° C., to melt and expand the valve filler composition.

The phase-transition material may be a gel or a thermoplastic material. The gel may be formed of polyacrylamide, polyacrylates, polymethacrylates, or polyvinylamides. The thermoplastic material may be formed of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), or polyvinylidene fluoride (PVDF).

The heat generation particles have an average diameter in the range of 1 nm to 100 μm so that the heat generation particles can freely pass through the connection passages 122A and 127A. When electromagnetic waves, such as a laser beam, are irradiated onto the heat generation particles, the heat generation particles generate heat. The heat generation particles may be beads. The beads may have a multiple layer structure. For example, the beads may have a core containing metal components and an outer hydrophobic layer on the core. In one exemplary embodiment, the metal component of the core is Fe and the outer hydrophobic layer is formed of a surfactant. Surfactants which may be used to form the outer hydrophobic layer, may be selected from one commonly known in the art. For example, a commercially available surfactant, such as those distributed by Ferrotech (Pittsburgh, Pa.), may be used. In one embodiment, the surfactant may include a polyethyleneglycol. The methods of the formation of such magnetic beads are known in the art, for example in U.S. Pat. No. 5,039,559 or 6,337,215, which are incorporated by reference herein in their entirety.

The heat generation particles may be stored and dispersed in a carrier oil. The carrier oil may be hydrophobic so that the heat generation particles having the hydrophobic surface layer can be uniformly dispersed therein. The carrier oil in which the heat generation particles are dispersed may be mixed with the wax to form the valve filler M. The carrier oil may be selected from one commonly known in the art. For example, commercially available ferrofluids, such as those distributed by Ferrotech (Pittsburgh, Pa.), may be used. In one embodiment, the carrier oil may include a hydrocarbon oil. The particles may be in the form of a quantum dot or a magnetic bead.

Figure 5:
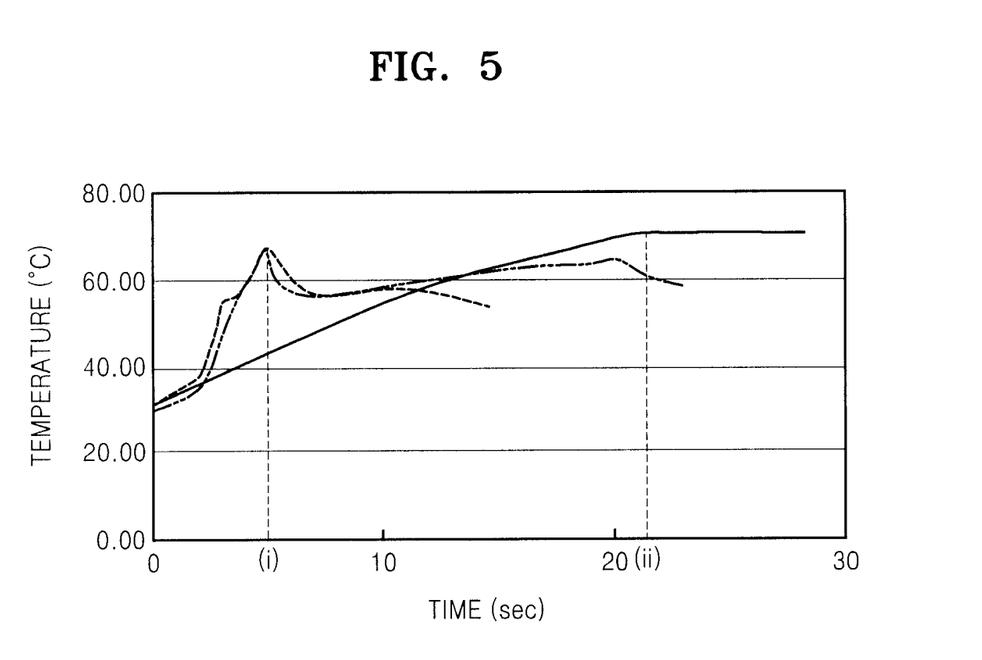
FIG. 5 is a graph illustrating the time taken to reach a melting point when laser is irradiated to pure paraffin wax and paraffin wax including heat generation particles heated by laser irradiation.

FIG. 5 is a graph illustrating the time taken to reach a melting point when laser is irradiated to pure paraffin wax and paraffin wax including heat generation particles heated by laser irradiation.

Referring to FIG. 5, the solid line shows a temperature variation of the pure paraffin wax. The dotted line and double dotted line each show temperature variations of 1:1 v/v and 1:4 v/v mixtures of heat generation particles and paraffin wax. The heat generation particles maybe ferronanoparticles, surface of which optionally treated with functional groups. The heat generation particles have an average diameter of 10 nm and are dispersed in a carrier oil. A laser beam having a wavelength of 808 nm was used for the test. The melting point of the paraffin wax ranges from about 68° C. to 74° C. Referring to FIG. 5, the pure paraffin wax reached the melting point after more than 20 seconds elapsed (see (ii) in FIG. 5). The 1:1 and 1:4 mixtures of paraffin wax were quickly heated to reach the melting point. That is, the 1:1 and 1:4 mixtures of paraffin wax reached the melting point after about 5 seconds of heating (see (i) in FIG. 5).

Referring again to FIGS. 3 and 4, the heat generation particles may include ferromagnetic materials, such as Fe, Ni, Co, or an oxide thereof. Oxides may include, but is not limited to, $Fe_2O_3$ and $Fe_2O_4$. The heat generation particles may include a metal oxide, such as $Al_2O_3$, $TiO_2$, $Ta_2O_3$, $Fe_2O_3$, $Fe_2O_4$, or $HfO_2$, etc. When the heat generation particles include such a ferromagnetic material, it is possible to easily adjust the position of the heat generation particles using a magnet. Therefore, after the valve filler M is injected through the valve filler holes 121A and 126A, it is possible to move the valve filler M to a position where the fluid channel 111 can be more easily closed with the valve filler M using the magnet at an external side of the substrate 101.

The laser beam source 150 may include a laser diode. A laser beam source that can irradiate a pulse laser beam having energy of at least 1 mJ/pulse may be used as the laser beam source 150. Alternatively, a laser beam source that can irradiate a continuous wave laser beam having an output of at least 10 mW may be used as the laser beam source 150. The reaction apparatus 100A may further include another laser beam source (not shown) facing the valve chamber 125A of the valve unit 110A'. Alternatively, the reaction apparatus 100A may further include an optical path converting unit (e.g., one or more mirrors) for diverting an optical path of the laser beam source 150 in a direction toward the second valve chamber 125A.

Figure 6A:
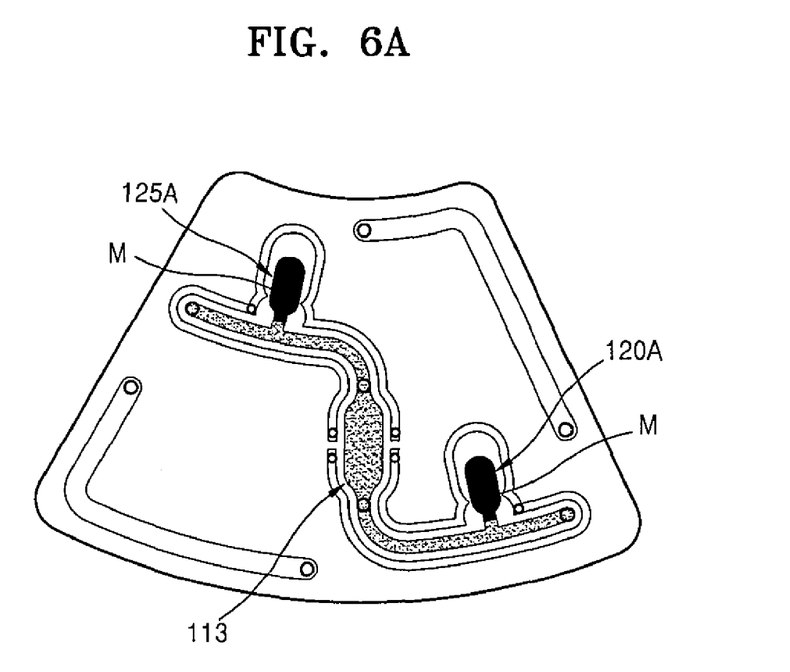
FIGS. 6A, 6B and 6C are pictures sequentially illustrating an operation test result of the valve unit shown in FIGS. 4 and 5.
Figure 6B:
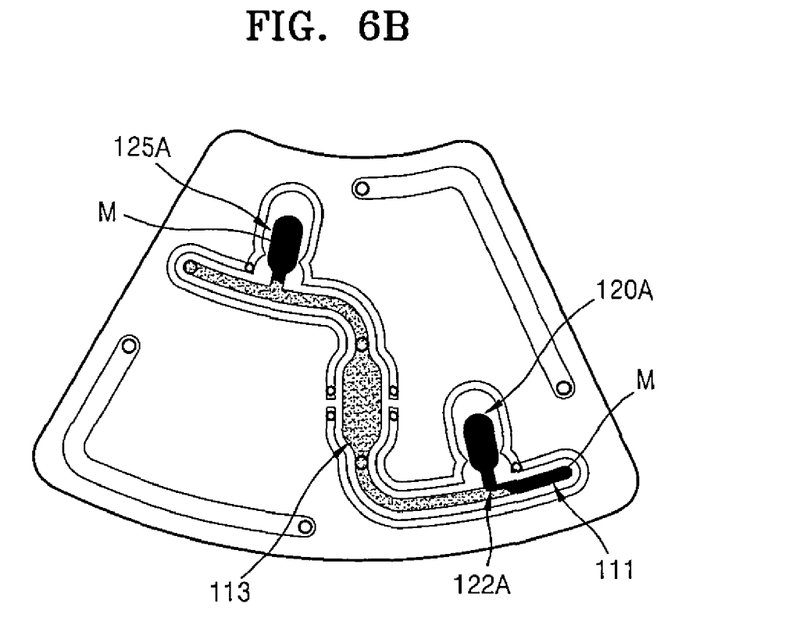
Figure 6C:
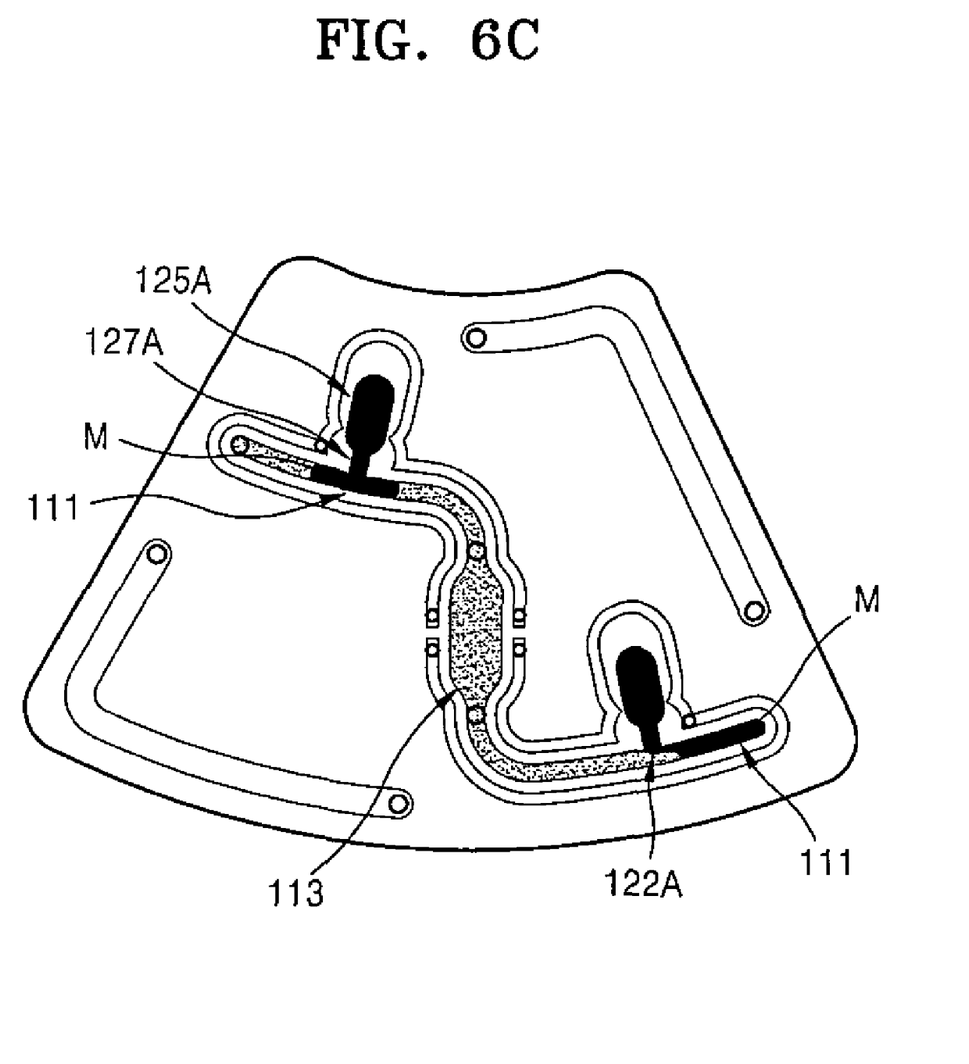

A test was conducted to observe the operation of the valve unit 110A. FIGS. 6A, 6B and 6C consecutively show the test results.

Referring to FIG. 6A, a black valve filler M is filled in the first and second valve chambers 120A and 125A. The black valve filler is 1:1 mixture of paraffin wax, in which a carrier oil containing heat generation particles of a diameter of 10 nm and paraffin wax are mixed in a ratio of 1:1 by volume. Referring to FIG. 6B, when the continuous wave laser beam of 1.5 W is irradiated to the first valve chamber 120A, the valve filler M in the first valve chamber 120A is quickly heated to expand as if it is exploding. Then, the valve filler M is directed into the fluid channel 111 through the first connection passage 122A. The valve filler M directed to the fluid channel 111 is quickly cooled down by stopping the irradiation of the laser beam and is thus solidified so as to close the fluid channel 111 connected to one of the reaction chamber 113.

Referring to FIG. 6C, when the continuous wave laser beam of 1.5 W is irradiated to the second valve chamber 125A, the valve filler M in the second valve chamber 125A is quickly heated to make it expand as if it is exploding. Then, the valve filler M is directed into the fluid channel 111 through the second connection passage 127A. The valve filler M directed to the fluid channel 111 is quickly cooled down by stopping the irradiation of the laser beam and is thus solidified so as to close the fluid channel 111 connected to the other side of the reaction chamber 113. After the fluid channel 111 is closed, the laser beam is irradiated to the green fluid in the reaction chamber 113 for 40 seconds in order to induce a lysis reaction. When examined to see if leakage from the closed fluid channel 111 occurs, leakage did not occur.

Figure 7:
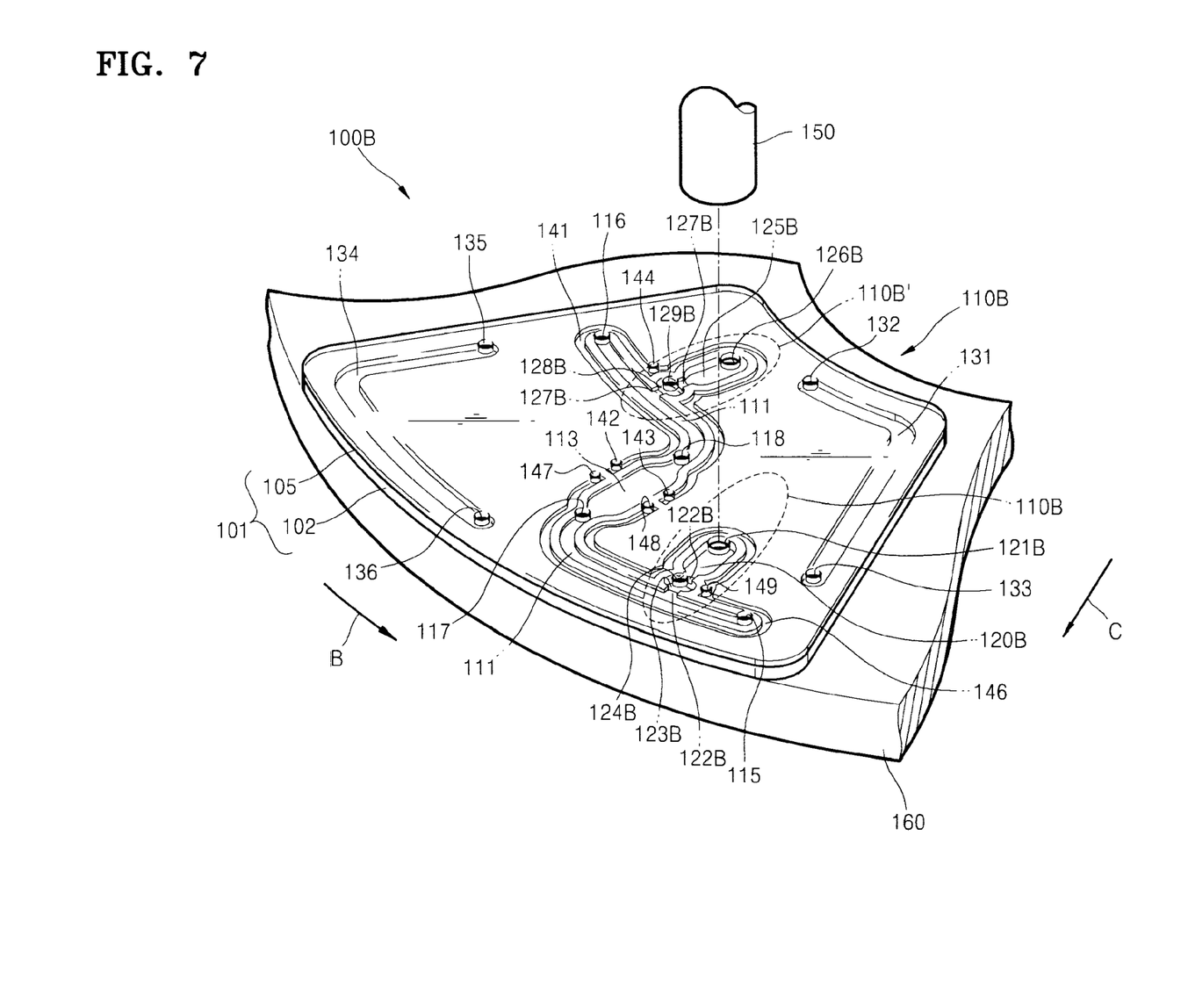
FIG. 7 is a perspective view of a reaction apparatus to which a valve unit according to another exemplary embodiment of the present invention is applied.
Figure 8:
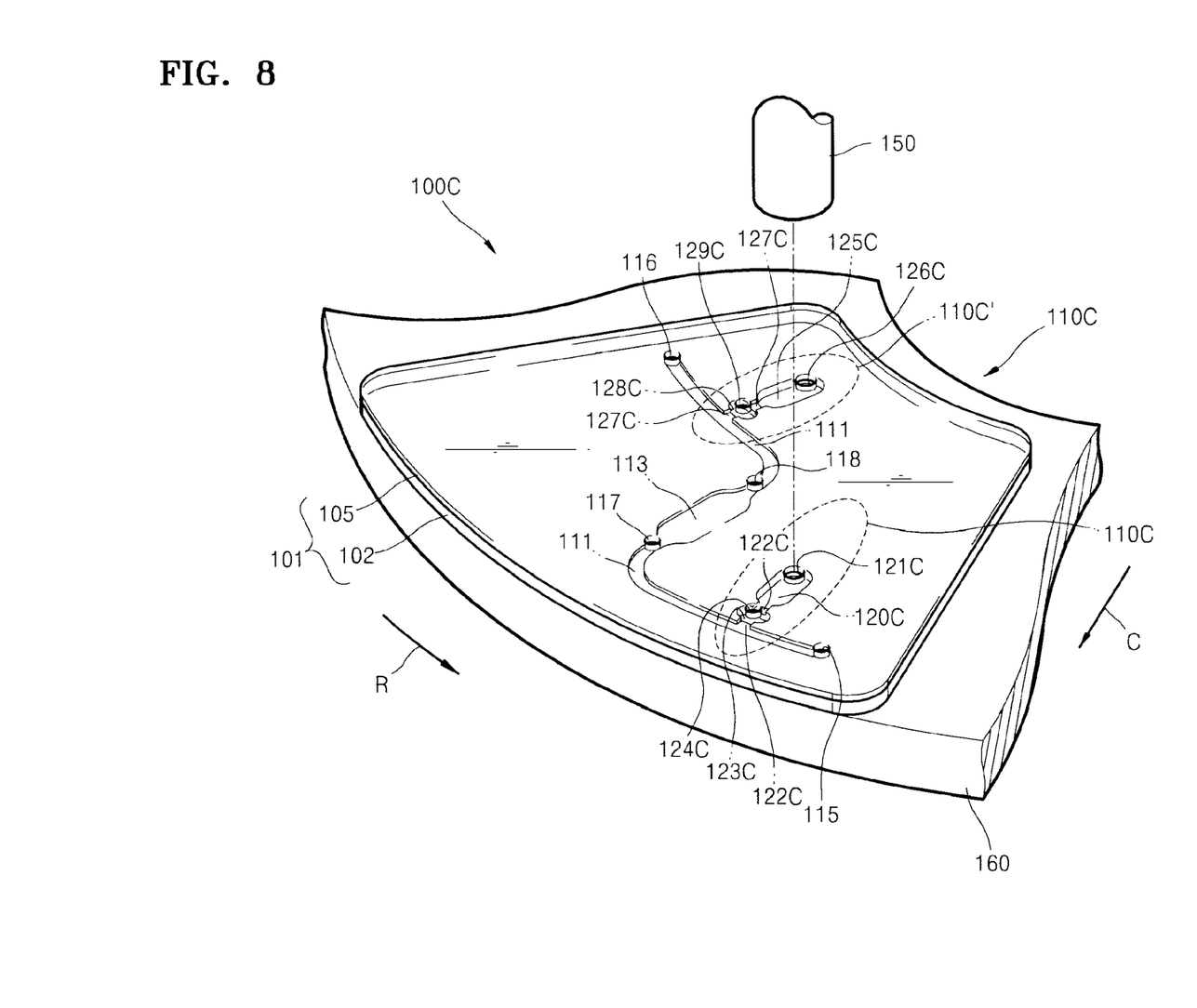
FIG. 8 is a perspective view of a reaction apparatus to which a valve unit according to another exemplary embodiment of the present invention is applied.

FIG. 7 is a perspective view of a reaction apparatus to which a valve unit according to another embodiment of the present invention is applied and FIG. 8 is a perspective view of a reaction apparatus to which a valve unit according to another embodiment of the present invention is applied.

Valve units 110B and 110C and reaction apparatuses 100B and 100C according to embodiments shown in FIGS. 7 and 8 are similar to those of the embodiment shown in FIGS. 3 and 4. Therefore, different parts or portions will be mainly described in the following description.

Referring first to FIG. 7, the reaction apparatus 100B includes a fluid channel 111 forming a flowing passage for a fluid, for example a biochemical reaction fluid a substrate 101 which is provided with a reaction chamber 113 is formed on the fluid channel 111, and a valve unit 110B which closes the fluid channel 111. The substrate 101 includes lower and upper plates 102 and 105 bonded together by adhesive.

The lower plate 102 is provided with the fluid channel 111 and the reaction chamber 113. The upper plate 105 is provided with a plurality of fluid holes 115 and 116 through which the fluid is injected into the fluid channel 111 and a plurality of vent holes 117 and 118 for preventing the generation of bubbles in the reaction chamber 113. Reference numerals 131, 134, 141, 146 indicate adhesive channels formed on the lower plate 102 and reference numerals 132, 133, 135, 136, 142, 144, 147, 148, and 149 denote adhesive holes formed on the upper plate 105.

Referring to FIG. 8, in a reaction apparatus of this embodiment, upper and lower plates 102 and 105 are thermally bonded together by an ultrasonic wave. Therefore, the substrate 101 is not provided with an adhesive channel forming a flowing passage for adhesive or adhesive holes for injecting the adhesive into the adhesive channel.

Referring again to FIG. 7, the reaction apparatus has two valve units 110B and 110B', each situated at opposite ends of the reaction chamber 113. The valve units 110B and 110B' each includes first and second valve chambers 120B and 125B, respectively, first and second connection passages 122B and 127B, respectively, and first and second and buffer chambers 123B and 128B, respectively, and a laser beam source 150. The valve chambers 120B and 125B may be formed in one of the lower and the upper plates. In one exemplary embodiment shown in FIG. 7, they are formed on the lower plate 102 and filled with a valve filler M (see FIG. 4). The upper plate 105 is provided with valve filler holes 121B and 126B through which the valve filler M is injected into the valve chambers 120B and 125B.

The first connection passage 122B connects the first valve chamber 120B to the fluid channel 111. The second connection passage 127B connects the second valve chamber 125B to the fluid channel 111. The first and second connection passages 122B and 127B may be formed in one of the lower and the upper plates. In one exemplary embodiment shown in FIG. 7, they are formed on the lower plate 102 of the substrate 101. The first buffer chamber 123B is formed on the first connection passage 122B between the first valve chamber 120B and the fluid channel 111. The second buffer chamber 128B is formed on the second connection passage 127B between the second valve chamber 125B and the fluid channel 111. The first and second buffer chambers 123B and 128B may be formed in one of the lower and the upper plates. In one exemplary embodiment shown in FIG. 7, they are provided on the lower plate 102. The upper plate 105 is provided with vent holes 124B and 129B at a portion corresponding to the first and second buffer chambers 123B and 128B. The buffer chambers 123B and 128B increase marginal tolerance of an injection amount of the valve filler M and prevent the valve filler M from flowing into the fluid channel 111 due to outer shock. Therefore, the buffer chambers 123B and 128B reduce the errors of the products.

The valve unit 110B closes the fluid channel 111 connected to one side of the reaction chamber 113 while the other valve unit 110B' closes the fluid channel 111 connected to the other side of the reaction chamber 113. Meanwhile, the valve filler M and the laser beam source 150 are identical to those of the embodiment shown in FIGS. 2 and 3 and thus a detailed description thereof will be omitted.

The reaction apparatus 100B further includes a turntable 160 supporting the substrate 101 and rotating at a high RPM in a direction indicated by arrow R. Therefore, the substrate 101 supported and rotated by the turntable 160 receives a centrifugal force in a direction indicated by arrow C. The valve filler M filled in the valve chambers 120B and 125B is pumped by the centrifugal force. Even though the turntable 160 is explained with respect to the rotation of the substrate 101, any other proper means, which are known in the art and can be selected by one skilled in the art, may be used for providing support and rotating the substrate at a desired RPM.

Referring again to FIG. 8, the valve unit 110C includes first and second valve chambers 120C and 125C, first and second connection passages 122C and 127C, first and second buffer chambers 123C and 128C, and a laser beam source 150. The reference numbers 121B and 126B denote valve filler holes through which the valve filler M is injected into the valve chambers 120B and 125B. The reference numbers 124C and 129C indicate vent holes for exhausting air.

The valve unit 110C, which includes the first valve chamber 120C, the first buffer chamber 123C and first connection passage 122C, is provided in order to close the fluid channel 111 connected to one side of the reaction chamber 113 while the valve unit 110C', which includes the second valve chamber 125C, the second buffer chamber 128C and the second connection passage 127C, is provided in order to close the fluid channel 111 connected to the other side of the reaction chamber 113. The reaction apparatus 100C includes a turntable 160 supporting and rotating the substrate 101 at a high RPM in a direction indicated by arrow R.

A test was conducted to check the operation of the valve unit 110B. FIGS. 9A, 9B, 9C, and 9D consecutively show the test results.

Figure 9A:
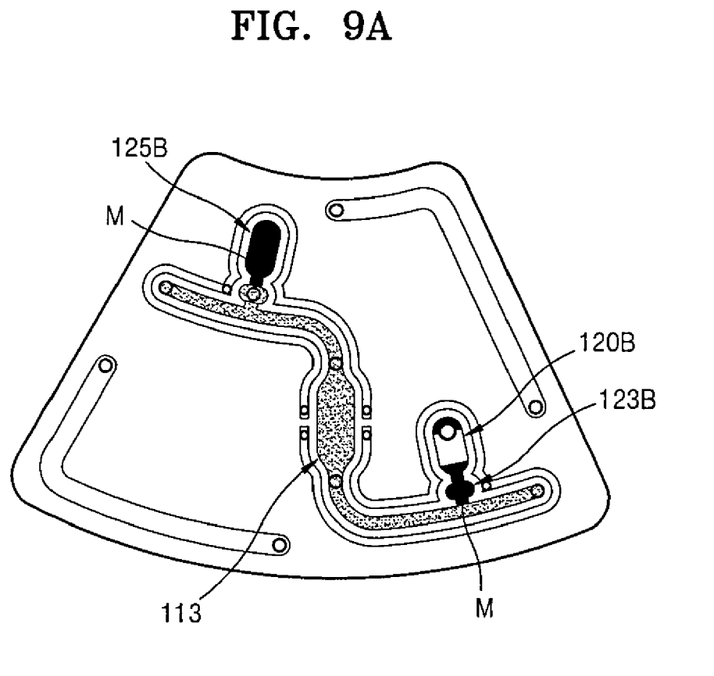
FIGS. 9A, 9B, 9C, and 9D are photographs sequentially illustrating an operation test result of the valve unit shown in FIG. 7.
Figure 9B:
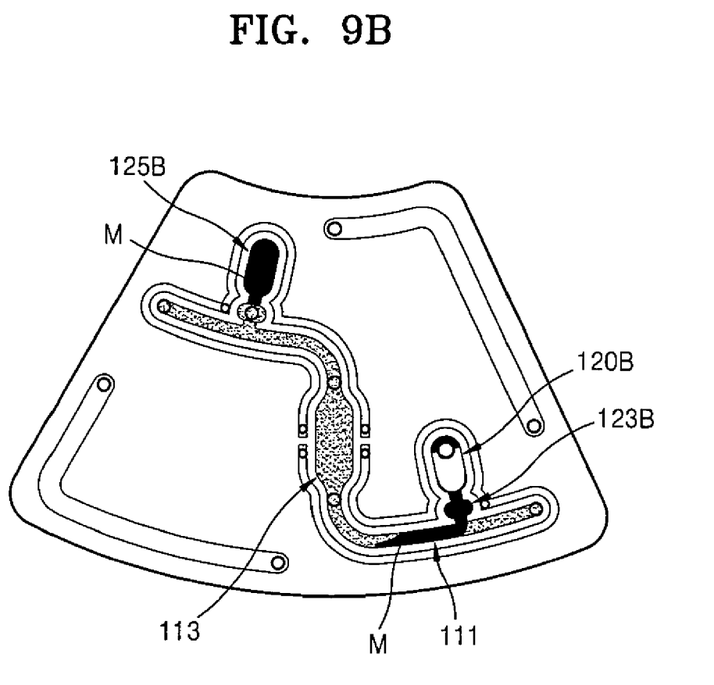
Figure 9C:
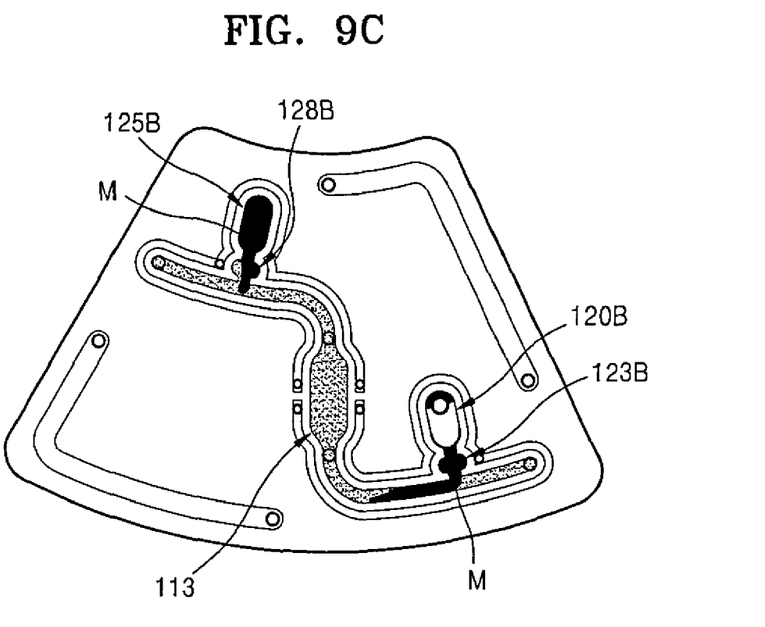
Figure 9D:
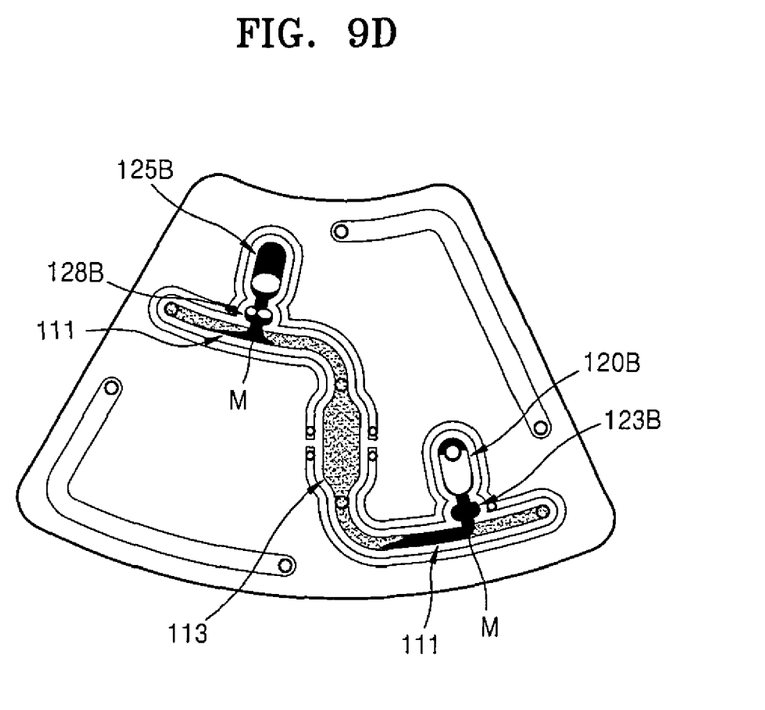

Referring to FIG. 9A, a black valve filler M is filled in the first and second valve chambers 120B and 125B. The black valve filler is a 1:1 v/v mixture of heat generation particles and paraffin wax. The heat generation particles have an average diameter of 10 nm. When the continuous wave laser beam of 1.5 W is irradiated to the first valve chamber 120B for one second and the substrate 101 (see FIG. 7) is rotated at 3000 rpm for several seconds, the valve filler M of the first valve chamber 120B is melted to expand and is pumped by the centrifugal force applied to the substrate 101. Then, the valve filler M is directed into the fluid channel 111 through the first buffer chamber 123B as shown in FIGS. 9A and 9B. The valve filler M directed to the fluid channel 111 is quickly cooled down by stopping the irradiation of the laser beam and is thus solidified so as to close the fluid channel 111 connected to one side of the reaction chamber 113.

When the continuous wave laser beam of 1.5 W is irradiated to the second valve chamber 125B for one second and the substrate 101 (see FIG. 7) is rotated at 3000 rpm for several seconds, the valve filler M of the second valve chamber 125B is melted to expand, and is pumped by the centrifugal force applied to the substrate 101. Then, the valve filler M is directed into the fluid channel 111 through the second buffer chamber 128B (see FIGS. 9C and 9D). The valve filler M directed to the fluid channel 111 is quickly cooled down by stopping the irradiation of the laser beam and is thus solidified so as to close the fluid channel 111 connected to the other side of the reaction chamber 113. After the fluid channel 111 is closed, it is determined whether leakage from the closed fluid channel 111 occurs as the substrate 101 is rotated at 3000 rpm. As a result, it was confirmed that leakage did not occur.

The present invention also provides a valve unit that can close a channel as a result of melting a valve filter including only a phase-transition material, not heat generation particles, by electromagnetic wave irradiation, and a reaction apparatus using the valve unit.

According to the present invention, no air pump or heating plate is provided, it is easy to reduce the size of the biochemical reaction substrate, and integration of the substrate is achieved.

In addition, since the closing of the channel is realized by the irradiation of electromagnetic waves, such as a laser beam, the channel can be quickly and timely closed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A valve unit comprising:
   a valve filler which includes a phase transition material;
   a chamber to receive the valve filler;
   a fluid channel; and
   a connection passage which is located between the chamber and the fluid channel and provides fluid communication between the chamber and the fluid channel,
   wherein the phase transition material melts and expands upon an application of the electromagnetic waves to the valve filler, and the valve filler is directed into the channel through the connection passage and closes the channel,
   which further comprises an external energy source applying electromagnetic waves to the valve filler,
   wherein the external energy source comprises a laser beam source irradiating a laser beam.

2. A reaction apparatus comprising:
   a substrate which provides a reaction chamber and a fluid channel, said reaction chamber and said fluid channel being fluid communicated with each other; and
   a valve unit which controls a flow in the fluid channel,
   wherein the valve unit comprises:
   a valve filler which includes a phase transition material;
   a valve chamber to receive the valve filler; and
   a connection passage,
   wherein the phase transition material melts and expands upon an application of the electromagnetic waves to the valve filler, and the valve filler is directed into the channel through the connection passage and closes the channel,
   which further includes an external energy source applying electromagnetic waves to the valve filler,
   wherein the external energy source comprises a laser beam source irradiating a laser beam.

3. A valve unit comprising:
   a valve filler which includes a phase transition material and a plurality of heat generation particles;
   a chamber to receive the valve filler;
   a fluid channel; and
   a connection passage which is located between the chamber and the fluid channel and provides fluid communication between the chamber and the fluid channel,
   wherein the heat generation particles are dispersed in the phase transition material and generate heat upon an application of electromagnetic wave energy, and wherein the phase transition material melts and expands upon an application of heat which is generated by the heat generation materials, and the valve filler is directed into the channel through the connection passage and closes the channel, which further comprises an external energy source, wherein the external energy source comprises a laser beam source irradiating a laser beam.

4. The valve unit of claim 3, wherein the laser beam source includes a laser diode.

5. The valve unit of claim 3, wherein the laser beam emitted from the laser beam source is a pulse electromagnetic wave having an energy of at least 1 mJ/pulse.

6. The valve unit of claim 3, wherein the laser beam emitted from the laser beam source is a continuous wave electromagnetic wave having an output of at least 10 mW.

7. The valve unit of claim 3, wherein the laser beam emitted from the laser beam source has a wavelength in the range of 750 to 1300 nm.

8. The valve unit of claim 3, wherein the heat generation particles are in the form of a quantum dot or a magnetic bead.

9. The valve unit of claim 3, further comprising a buffer chamber in the connection passage.

10. The valve unit of claim 3, wherein the heat generation particles have an average diameter in the range of 1 nm to 100 μm.

11. The valve unit of claim 10, wherein the heat generation particles are dispersed in a hydrophobic carrier oil.

12. The valve unit of claim 3, wherein the heat generation particles include a ferromagnetic material or a metal oxide.

13. The valve unit of claim 12, wherein the metal oxide is at least one selected from the group consisting of $Al_2O_3$, $TiO_2$, $Ta_2O_3$, $Fe_2O_3$, $Fe_2O_4$, and $HfO_2$.

14. The valve unit of claim 3, wherein the heat generation particles are formed of a polymer.

15. The valve unit of claim 14, wherein the heat generation particles are magnetic beads and the magnetic beads are formed of a magnetic material selected from the group consisting of Fe, Ni, Cr, and an oxide thereof.

16. The valve unit of claim 15, wherein the magnetic beads has a core formed from the magnetic material and further comprises an outer hydrophobic layer formed on the magnetic material core.

17. The valve unit of claim 3, wherein the phase-transition material is at least one selected from the group consisting of wax, a gel, and a thermoplastic resin.

18. The valve unit of claim 17, wherein the wax is at least one selected from the group consisting of paraffin wax, microcrystalline wax, synthetic wax, and natural wax.

19. The valve unit of claim 17, wherein the gel is formed of at least one material selected from the group consisting of polyacrylamide, polyacrylates, polymethacrylates, and polyvinylamides.

20. The valve unit of claim 17, wherein the thermoplastic resin is at least one selected from the group consisting of a cyclic olefin copolymer, a polymethylmethacrylate, a polycarbonate, a polystyrene, a polyoxymethylene, a perfluoralkoxy, a polyvinylchloride, a polypropylene, a polyethylene terephthalate, a polyetheretherketone, a polyamide, a polysulfone, and a polyvinylidene fluoride.

21. A reaction apparatus comprising:
a substrate which provides a reaction chamber and a fluid channel, said reaction chamber and said fluid channel being fluid communicated with each other; and
a valve unit which controls a flow in the fluid channel,
wherein the valve unit comprises:
a valve filler which includes a phase transition material and a plurality of heat generation particles;
a valve chamber to receive the valve filler; and
a connection passage,
wherein the connection passage is located between the valve chamber and the fluid channel and provides fluid communication between the valve chamber and the fluid channel,
wherein the heat generation particles are dispersed in the phase transition material and generate heat upon an application of electromagnetic wave energy;
wherein the phase transition material is in solid phase at an operational temperature of the apparatus, and wherein the phase transition material melts and expands upon an application of heat which is generated by the heat generation materials, and the valve filler is directed into the channel through the connection passage and closes the channel,
wherein the valve unit further comprises an external energy source which applies electromagnetic waves to the valve filler,
wherein the external energy source comprises a laser beam source irradiating a laser beam.

22. The reaction apparatus of claim 21, wherein the laser beam source includes a laser diode.

23. The reaction apparatus of claim 21, wherein the laser beam emitted from the laser beam source is a pulse electromagnetic wave having an energy of at least 1 mJ/pulse.

24. The reaction apparatus of claim 21, wherein the laser beam emitted from the laser beam source is a continuous wave electromagnetic wave having an output of at least 10 mW.

25. The reaction apparatus of claim 21, wherein the laser beam emitted from the laser beam source has a wavelength in the range of 750 to 1300 nm.

26. The reaction apparatus of claim 21, wherein the heat generation particles are formed of a polymer.

27. The reaction apparatus of claim 21, further comprising a buffer chamber in the connection passage.

28. The reaction apparatus of claim 21, further comprising a rotating unit which rotates the substrate, wherein the valve filler, in its melted phase, is pumped to the fluid channel by a centrifugal force generated by the rotation of the substrate.

29. The reaction apparatus of claim 21, wherein the reaction chamber has an inlet port and an outlet port each fluid communicate with the fluid channel and the reaction apparatus comprises at least two valve units which each close the fluid channel on the side of the inlet port and the side of the outlet port of the reaction chamber, respectively.

30. The reaction apparatus of claim 21, wherein the substrate is provided with a fluid hole, through which the fluid is injected into the fluid channel, and with a valve filler hole, through which the valve filler is injected into the valve chamber.

31. The reaction apparatus of claim 21, wherein at least a portion of the substrate is transparent so that the electromagnetic wave can be transmitted therethrough.

32. The reaction apparatus of claim 21, wherein the heat generation particles have an average diameter in the range of 1 nm to 100 μm.

33. The reaction apparatus of claim 32, wherein the heat generation particles are dispersed in a hydrophobic carrier oil.

34. The reaction apparatus of claim 21, wherein the heat generation particles include a ferromagnetic material or a metal oxide.

35. The reaction apparatus of claim 34, wherein the metal oxide is at least one selected from the group consisting of $Al_2O_3$, $TiO_2$, $Ta_2O_3$, $Fe_2O_3$, $Fe_2O_4$, and $HfO_2$.

36. The reaction apparatus of claim 21, wherein the heat generation particles are in the form of a quantum dot or a magnetic bead.

37. The reaction apparatus of claim 36, wherein the heat generation particles are magnetic beads and the magnetic beads are formed of a magnetic material selected from the group consisting of Fe, Ni, Cr, and an oxide thereof.

38. The reaction apparatus of claim 21, wherein the phase-transition material is at least one selected from the group consisting of wax, a gel, and a thermoplastic resin.

39. The reaction apparatus of claim 38, wherein the wax is at least one selected from the group consisting of paraffin wax, microcrystalline wax, synthetic wax, and natural wax.

40. The reaction apparatus of claim 38, wherein the gel is formed of at least one material selected from the group consisting of polyacrylamide, polyacrylates, polymethacrylates, and polyvinylamides.

41. The reaction apparatus of claim 38, wherein the thermoplastic resin is at least one selected from the group consisting of a cyclic olefin copolymer, a polymethylmethacrylate, a polycarbonate, a polystyrene, a polyoxymethylene, a perfluoralkoxy, a polyvinylchloride, a polypropylene, a polyethylene terephthalate, a polyetheretherketone, a polyamide, a polysulfone, and a polyvinylidene fluoride.

42. The reaction apparatus of claim 21, wherein the substrate includes upper and lower plates bonded together.

43. The reaction apparatus of claim 42, wherein the upper and lower plates are bonded together by an adhesive or are thermally bonded together by an ultrasonic wave.

44. The reaction apparatus of claim 42, wherein the fluid channel, the reaction chamber, the valve chamber, and the connection passage are formed on one of the upper and lower substrates.

* * * * *